United States Patent Office 3,081,198
Patented Mar. 12, 1963

3,081,198
MINERAL-COATED PAPER PRODUCTS AND METHODS FOR MAKING THEM
Edgar W. Miller, Levittown, Pa., assignor to Rohm & Haas Company, Philadelphia, Pa., a corporation of Delaware
No Drawing. Filed Apr. 13, 1960, Ser. No. 21,889
13 Claims. (Cl. 117—155)

This invention relates to mineral-coating compositions and to paper coated therewith. Mineral-coating compositions, such as are commonly applied to paper body stock in the manufacture of mineral-coated paper and the like, comprise aqueous suspensions of finely divided mineral matter, referred to herein as pigment, such as clay, calcium carbonate, blanc fixe, finely divided metals such as aluminum, color lakes, tinctorial oxides, or the like and an aqueous dispersion or solution of an adhesive such as casein, glue, starch, or the like.

In general, mineral coatings are applied to paper to improve the appearance, the printing qualities, or other properties of the paper. The mineral-coating covers the individual fibers of the paper surface and fills interstices between fibers, thus rendering the surface of the paper more level and more uniform in texture. It is primarily the pigment content of the coating composition which provides the desirable qualities of the coating, whereas the adhesive provides chiefly the function of suitably binding the mineral matter to the paper; e.g. so that it will not be removed by the pull of printing ink during the printing operation. Nevertheless, the particular adhesive used does have considerable influence upon the working qualities of the coating composition; e.g., viscosity, flow, spreadability, etc. Likewise, the adhesive used in the coating composition has a definite effect upon the quality and appearance of the finished coated paper made therewith.

For example, the plasticity of the adhesive has a pronounced effect on the ability of the supercalender to produce a level and good printing surface.

It has heretofore been suggested to employ various pigmented aqueous dispersions of such water-insoluble synthetic resinous polymers as polymerized methyl acrylate, ethyl acrylate, or butyl acrylate, or methyl or butyl acrylate copolymerized with acrylonitrile or ethyl, methyl or butyl methacrylate. However, such polymers have been found to be insufficiently adherent to the paper to reliably resist being pulled up by the ink during printing operations. United States Patent 2,790,735 discloses and claims coated papers obtained by the application of pigmented aqueous dispersions containing 8 to 25%, on the weight of the pigment of water-insoluble copolymers of a lower alkyl acrylate with 4 to 7% of an acid, or salt thereof, selected from methacrylic and acrylic acids. United States Patent 2,790,736 discloses and claims coated papers obtained by the application of pigmented aqueous dispersions containing 8 to 25%, on the weight of the pigment, of water-insoluble copolymers of a lower alkyl acrylate with 2.5% to 7% of an acid, or a salt thereof, selected from certain monoethylenically unsaturated polybasic acids, such as itaconic, aconitic, the dimer of methacrylic acid, the trimer of methacrylic acid, maleic acid, and fumaric acid. A copending United States patent application Serial No. 541,072, filed October 17, 1955, now Patent No. 2,874,066, discloses and claims coated papers obtained by the application of pigmented aqueous dispersions containing 8 to 25% on the weight of the pigment, of water-insoluble copolymers of 2.5% to 7% by weight of an unsaturated amide, such as acrylamide or methacrylamide. Aqueous dispersions of the various water-insoluble copolymers can be satisfactorily applied in large excess by an applicator roll rotating in such a direction that the surface travels opposite to the direction of travel of the sheet followed by a slowly rotating metering rod to limit the thickness of the coating. Another system involves applying excess and blowing off the excess by what is called an "air-knife." However, these water-insoluble polymer dispersions cannot be satisfactorily applied by certain conventional coaters in which the pigmented coating is applied as a high-solids, high-viscosity system to the first of a train of transfer rolls on which the composition is worked as it passes from one nip to the next until it is finally brought into contact with the paper sheet by contact therewith of the last roll of the train. This latter type of coating equipment has the advantage of high speed, especially with respect to drying since the high-solids system contains less solvent or vehicle to be removed during drying. However, the water-insoluble polymer dispersions produce an irregular pattern which is commonly referred to by the term "turkey-tracks."

In accordance with the present invention, it has been found that various aqueous alkaline mineral coating compositions including any of those mentioned can be markedly improved by the incorporation therein of a water-soluble ammonium or amine salt of a copolymer of about 15 to 40% by weight of an acid of the formula

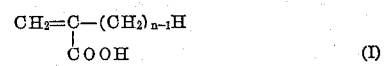

$$CH_2=C-(CH_2)_{n-1}H$$
$$\phantom{CH_2=C-}|$$
$$\phantom{CH_2=C-}COOH \qquad (I)$$

in which $n$ is an integer having a value of 1 to 2, with 60 to 85% of at least one ester of an acid of the formula with an alcohol having from 1 to 4 carbon atoms.

The preferred copolymers of the present invention are those having comparatively low molecular weights from about 50,000 up to about 300,000; but copolymers having higher molecular weights even up to about one million can be used but require special care because of their high viscosity after neutralization.

The copolymers may be made by various procedures. However, in general, an emulsion process, employing an appropriate amount of a chain regulator to produce the preferred low molecular weight copolymers, is most suitable. In general, the polymerization may be effected by introducing a mixture of the several monomers in appropriate proportions, a free-radical polymerization initiator, and, for making the preferred copolymers, a chain regulator into an aqueous solution of an emulsifying and/or dispersing agent.

The initiator may be an organic peroxide such as benzoyl peroxide, acetyl peroxide, lauroyl peroxide, or it may be an azo compound such as diisoazobutyronitrile.

The amount of the initiator may vary from about 0.5% to 6% by weight of the total weight of the monomers. The amount of the chain regulator may vary from 0.1% to 1.5% more or less depending upon the particular chain regulator. Examples of chain regulators include long-chain alkyl mercaptans, e.g. t-dodecyl mercaptan, octyl mercaptan, octadecyl mercaptan, alcohols, such as isopropanol, isobutanol, or higher alcohols, such as t-octyl alcohol and lauryl alcohol, carbon tetrachloride, ethylene tetrachloride $C_2Cl_4$, bromotrichloromethane, and substituted allyl chloride, such as methallyl chloride.

The following example illustrates the preparation of the copolymer salts. The parts and percentages are by weight unless otherwise noted.

EXAMPLE A

The following are added to a reaction vessel:

|  | Cc. |
|---|---|
| Water | 900 |
| Solution of 0.25 gram $FeSO_4 \cdot 7H_2O$ in 500 cc. water | 75 |
| t-Butyl hydroperoxide | 0.3 |

An aqueous emulsion is prepared by agitating together in a separate vessel the following:

| | |
|---|---|
| Sodium lauryl sulfate (27%) grams | 111 |
| Deionized water cc | 1020 |
| Ammonium persulfate grams | 3 |
| Ethyl acrylate do | 375 |
| Methyl methacrylate do | 750 |
| Methacrylic acid (glacial) do | 375 |
| Bromotrichloromethane do | 15 |

To the reaction vessel, there are then added 450 grams of the monomer emulsion, the temperature of the contents being then adjusted to 20° C., and 0.6 gram of sodium metabisulfite is then added. The temperature rises and levels off at about 50° C. Then additional monomer emulsion is added at a rate of 222 grams every ten minutes and concurrently a solution of 3.75 grams of sodium metabisulfite in 150 cc. of water is added at a rate of 15 cc. every ten minutes until all of the emulsion and metabisulfite are added. The total time of polymerization (during which the temperature is maintained at 50° to 56° C. by cooling) amounts to 110 minutes at which time about ten drops of t-butyl hydroperoxide are added and the reaction mixture is stirred another half hour. After cooling to 30° C., the dispersion is filtered. The filtrate provides an approximately 40% solids emulsion copolymer dispersion (substantially 100% yield) in which the copolymer composition is approximately 25% methacrylic acid, 50% methyl methacrylate, and 25% ethyl acrylate.

The polymer of the present invention is best incorporated in the coating composition by first adding all other binders which are to be used to the water of dilution. Then, the aqueous dispersion of the water-insoluble acid polymer (prepared as in Example A) is added and followed by the addition of an aqueous dispersion of the various pigments. The acid polymer is then solubilized in situ by adding about 1 to 2 equivalents of ammonium hydroxide or of a volatile amine, based on the acid content of the polymer. If casein, soya-protein, or some other alkali-dispersed binder is used, it is especially desirable to add the acid-containing emulsion polymer last. Neutralization of the added acid polymer occurs rapidly on addition to the alkaline binder dispersion.

Instead of ammonia, aqueous solutions of volatile, water-soluble amines may be used in forming the binder dispersion or solution. Such amines include diethylamine, triethylamine, ethanolamine, diethanolamine, triethanolamine, and morpholine.

The amount of the copolymer salts of low molecular weight included in the pigmented mineral coating compositions may vary widely from as low as about 5% by weight of the total binder content therein to as high as 65% by weight thereof. The amount of the binder in such coatings is from 8 to 25% by weight of the pigment, and is preferably 12 to 20% by weight thereof.

The other component or components of the binder of the mineral coating composition may be a protein soluble in the alkaline dispersion or it may be a synthetic linear addition polymer which is insoluble in the aqueous alkaline system. Examples of the proteins that may be used include casein, soya-protein, soybean protein, or the like. The polymers may be any natural, artificial, or synthetic rubber latex or an aqueous emulsion polymer of isobutylene, butadiene, ethylene, vinyl acetate, vinyl chloride, vinylidene chloride, acrylonitrile, methacrylonitrile, esters of acrylic acid or methacrylic acid such as those of methyl acrylate, ethyl acrylate, butyl acrylate, and copolymers thereof, with methyl, ethyl, or butyl methacrylate. A desirable characteristic of these synthetic polymers is the apparent second order transition temperature value thereof which is preferably from −45° C. to +20° C. except in the case of copolymers formed largely of vinyl acetate, such as copolymers of 70 to 93% vinyl acetate, 5 to 25% ethyl or methyl acrylate, and 2 to 8% of acrylic, methacrylic, or itaconic acid.

This second order transition temperature is herein referred to as the $T_i$ value and is defined as the transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.$^2$.

The other component or components of the binder may also be any of the water-insoluble and alkali-insoluble copolymers having an apparent second order transition temperature ($T_i$ value) of −45° C. to +20° C. and described in the patents or applications mentioned hereinabove, namely United States Patents 2,790,735, 2,790,736, and 2,874,066.

When used with the proteins, it has been found that the copolymer salts of the present invention surprisingly increase the wet-rub resistance of the coatings obtained. Many of the copolymer salts which contain a large proportion of an acrylic acid ester, such as ethyl acrylate, butyl acrylate, and so on, plasticize the protein. When the copolymer salts of the present invention are dissolved in the aqueous phase of the aqueous dispersions of the polymers mentioned hereinabove, whether the aqueous dispersions are natural, as in natural rubber latex, or of synthetic origin, it has been found that the compositions obtained can be applied to the paper surfaces as a high solids, high viscosity system by means of the conventional coaters comprising a train of transfer rolls without giving rise to the turkey-tracks commonly resulting from the application of aqueous dispersions of water-insoluble polymers. In addition, the presence of the copolymer salt of the present invention imparts the improved resistance to picking especially when the other component of the binder is a water-insoluble polymer which contains neither carboxylate salt groups nor amide groups.

In general, the compositions may be prepared by mixing the copolymer salt of the present invention, preferably in the form of an aqueous solution thereof, with the other binder, preferably in the form of an aqueous solution as in the case of the protein or as an aqueous dispersion in the case of the insoluble polymer.

The pigment or pigments are preferably mixed and dispersed in a small amount of water before mixing with the copolymer dispersion. When clay is used as a part of the pigment, and in preferred embodiments it forms a predominant proportion of the pigment, the dispersion is preferably adjusted to a pH of 8.5 to 9.5 to obtain the optimum dispersion of the clay.

After mixing the pigment and the copolymer dispersions, the resulting coating composition is applied to the paper or paperboard at a total solids concentration of at least 40% and preferably 50 to 60% by any suitable equipment such as immersion roll and doctor system, gravure roller system, brush coater, spray coater, or conventional transfer roll coater as described hereinabove. It may be applied to the paper after drying and/or conditioning. Alternatively, it may be applied during the first drying operation on the paper where it has undergone only partial drying. For example, the coating system may be mounted at an intermediate point in the drier on the papermaking machine, such as at a point where the paper has been reduced to approximately 50% moisture content.

After the coating operation, the coated sheet is dried and may then be calendered, and subsequently printed. The drying may be the usual type provided in which air at about 230° to 260° F. (110° to 130° C.) is directed against the paper for 30 to 45 seconds. The paper and coating may reach a temperature of about 180° F. (ca. 85° C.) during the drying operation. Printing may be effected by the conventional inks of precipitation type or heat-setting type including those based on drying oils. The coated products of the present invention are receptive to single color inks and multi-color inks of graded viscosity and are able to withstand the pull of such inks. It may be overcoated, after printing, with wax, lacquer, or other compositions.

The pigments that may be employed include clays, especially of the kaolin type, calcium carbonate, blanc fixe, talc, titanium dioxide, colored lakes and toners, ochre, carbon black, graphite, aluminum powder or flake, chrome yellow, molybdate orange, toluidine red, copper phthalocyanines, such as the "Monastral" blue and green lakes. The term "mineral" in the claims is intended to cover all such types of pigmentary matter whether of strict mineral character or partly of organic material.

The compositions are adapted to be satisfactorily applied without irregular pattern-development by a wide variety of equipment including those involving a train of transfer rolls for working the composition as it is fed from nip to nip to the point of contact with the paper. The coated papers are highly resistant to pick and, surprisingly, to wet-rubbing.

In the following examples, which are illustrative of the present invention, the parts and percentages are by weight unless otherwise noted. The ink numbers referred to designate inks of the Institute of Printing having graded tackiness increasing from No. 1 to No. 6. The numerical values given under "Pick Resistance" refer to the linear speed (in feet per minute of the sector in an I.G.T. Pick Resistance Tester) at which coating failure occurs when using the ink referred to. The higher the value, the greater the resistance. In the wet-rub test used in the examples, the coated paper to be tested is lapped over a piece of glossy black paper so that a substantial area of the black paper is exposed and extends beyond the edge of the coated paper to be tested and a drop of water is applied to the coating to be tested. The index finger of the operator is drawn from the wet spot on the coating and onto the black paper with light pressure, and the procedure is repeated ten times. The water on the black paper is allowed to evaporate, and the reflection of light from the spot thereof to which any pigment is transferred from the coated sheet by the finger is measured. The higher the reflection of light, the poorer is the wet-rub resistance. The values given under "Web-Rub Resistance" refer to the brightness (reflectance) of the spot of coating rubbed off onto the black paper. Smaller values indicate better wet-rub resistance.

*Example 1*

(a) A series of coating compositions were made containing mixtures in various proportions of the emulsion polymer of Example A with an emulsion copolymer (B) of about 80% of ethyl acrylate, 3% of itaconic acid, and 17% of methyl methacrylate, having a $T_i$ value of about 2° to 5° C. Table I following indicates the proportions of the copolymers in the respective mixtures. After mixing the two emulsion copolymers, water was added to reduce the solids concentration to 55%. A clay dispersion having a pH of 9 and consisting of 100 parts of clay, 44 parts of water, and 0.2% (on clay) of sodium hexametaphosphate was mixed with the polymer dispersion in an amount to provide 10% of total polymer solids on clay. Then, 1.5 equivalents (based on acid content of the polymers) of ammonium hydroxide was added.

The various coating compositions thus obtained were applied to paperboard by means of a train of transfer rolls, the last of which contacted the travelling sheet of paper, no wiper, spreader, or excess removing device being applied after the transfer roll contacted the paper. About 2 to 3 pounds of coating composition (dry weight) per 1,000 sq. ft. of the board was then applied to one surface. The coated paper was dried in an oven by air heated at 185° F. for a period of 45 to 60 seconds. It was then calendered at room temperature. The coated board showed no evidence of irregular pigmentation (turkey-tracking) and had a good, smooth surface highly receptive to ink and resistant to pick. It also showed good resistance to wet rubbing as is shown in the appended table.

TABLE I

| Coating No. | Binder Composition (percent) | | Pick Resistance No. 6 Ink | Wet-Rub Resistance |
|---|---|---|---|---|
| | Polymer (B) | Polymer of Example A | | |
| 1 | 100 | 0 | 135 | 18 |
| 2 | 80 | 20 | 155 | 12 |
| 3 | 60 | 40 | 100 | 7.5 |
| 4 | 50 | 50 | 110 | 5 |
| 5 | 40 | 60 | 110 | 6 |
| 6 | 0 | 100 | 70 | 4 |

(b) Similar coating compositions were presented in which the emulsion copolymer (B) was replaced with a copolymer of 95% of ethyl acrylate and 5% of methacrylamide and the copolymer of Example A was replaced with a copolymer prepared in the same fashion except that the monomer components consisted of 38% by weight of acrylic acid, 20% by weight of ethyl acrylate, and 42% by weight of 2-ethylhexyl acrylate. The coatings showed good pick resistance against a No. 4 ink and good wet-rub resistance.

*Example 2*

(a) The polymer of Example A was used in conjunction with soya-protein as a binder. Coatings with various ratios of the two binders were made up, using 16% of total binder based on pigment. The coatings were applied to paper as in Example 1; the test results are reproduced in Table II.

TABLE II

| Coating No. | Binder Composition (percent) | | Wet-Rub Resistance |
|---|---|---|---|
| | Soya-Protein | Polymer of Example A | |
| 1 | 100 | 0 | 25 |
| 2 | 98 | 2 | 25 |
| 3 | 95 | 5 | 9 |
| 4 | 90 | 10 | 9 |
| 5 | 85 | 15 | 9 |
| 6 | 80 | 20 | 7 |
| 7 | 70 | 30 | 6 |

(b) Coatings having comparable wet-rub resistance were obtained when the procedure of part (a) was repeated except that the soya-protein was replaced with casein.

(c) The procedure of Example 1 (a) is repeated substituting a copolymer of 90% by weight of vinyl acetate, 5% by weight of ethyl acrylate, and 5% by weight of acrylic acid for the copolymer (B) of that example. The coatings exhibited good wet-rub resistance and resistance to pick by a No. 4 ink.

(d) The procedure of part (a) hereof is repeated substituting for the polymer of Example A a copolymer prepared in the same fashion as Example A but from a mixture of monomers consisting of 30% by weight of methacrylic acid, 25% by weight of methyl methacrylate, and 45% by weight of methyl acrylate. The coatings showed good wet-rub resistance and resistance to pick by a No. 4 ink.

*Example 3*

(a) The polymer of Example A was used in conjunction with a copolymer (C) of 40% butadiene/60% styrene in coating compositions which were made up as described in Example 1 using two different levels of binder weight on pigment. The results in Table III were obtained.

TABLE III

| Coating No. | Binder Composition (percent) | | Percent Binder on Pigment | Pick Resistance No. 4 Ink | Wet-Rub Resistance |
| --- | --- | --- | --- | --- | --- |
| | Polymer of Example A | Polymer C | | | |
| 1 | 0 | 100 | 10 | 27 | 49 |
| 2 | 29 | 71 | 10 | 120 | 30 |
| 3 | 0 | 100 | 16 | 115 | 35 |
| 4 | 29 | 71 | 16 | 157 | 12 |

(b) The procedure of part (a) hereof is repeated replacing the latex of polymer (C) with a natural rubber latex. The resulting product showed good wet-rub resistance.

*Example 4*

The procedure of Example 1(a) is repeated with the same copolymer (B) in conjunction with a copolymer of 15% of methacrylic acid, 45% methyl methacrylate, and 40% of ethyl acrylate, having a viscosity of 1.6 poises, at a 10% concentration, used in place of the copolymer of Example A. The proportions of copolymer (B) relative to the methacrylic acid copolymer were 40:60 parts by weight. Coatings obtained from this composition showed good pick resistance since the failure in the coating did not occur until a speed of 150 ft. per minute was reached with a No. 4 ink.

I claim:

1. A mineral-coated paper product comprising a paper sheet carrying on a surface thereof a dried coating of a composition comprising (1) a finely-divided pigmentary material having a predominant proportion of clay and (2) a binder comprising, for each 100 parts by weight of the pigment, from 8 to 25 parts by weight of a mixture comprising (a) 5 to 65% by weight of a water-soluble ammonium salt of a copolymer, having a molecular weight of at least about 50,000, of about 15 to 40% by weight of an acid of the formula $$CH_2=C-(CH_2)_{n-1}H$$
$$|$$
$$COOH$$

in which $n$ is an integer having a value of 1 to 2, and 60 to 85% of at least one ester of an acid of the aforesaid formula with an alcohol having 1 to 2 carbon atoms and (b) 35 to 95% by weight of an alkali-soluble protein.

2. A product as defined in claim 1 in which the protein is casein.

3. A product as defined in claim 1 in which the protein is soya-protein.

4. A mineral-coated paper product comprising a paper sheet carrying on a surface thereof a dried coating of a composition comprising (1) a finely-divided pigmentary material having a predominant proportion of clay and (2) a binder comprising, for each 100 parts by weight of the pigment, from 8 to 25 parts by weight of a mixture comprising (a) 5 to 65% by weight of a water-soluble ammonium salt of a copolymer, having a molecular weight of at least about 50,000 of about 15 to 40% by weight of an acid of the formula $$CH_2=C-(CH_2)_{n-1}H$$
$$|$$
$$COOH$$

in which $n$ is an integer having a value of 1 to 2, and 60 to 85% of at least one ester of an acid of the aforesaid formula with an alcohol having 1 to 2 carbon atoms and (b) 35 to 95% by weight of a water-insoluble, alkali-insoluble linear addition polymer selected from the group consisting of polymers having an apparent second order transition temperature from −45° C. to +20° C. and polymers formed largely of vinyl acetate.

5. A product as defined in claim 4 in which said linear addition polymer is natural rubber.

6. A product as defined in claim 4 in which said linear addition polymer is a synthetic rubber.

7. A product as defined in claim 4 in which said linear addition polymer is a polymer of at least one member selected from the group consisting of butadiene, styrene, isobutylene, ethylene, vinyl acetate, vinyl chloride, vinylidene chloride, acrylonitrile, methacrylonitrile, and esters of an acid of the aforesaid formula with an alkanol having from 1 to 8 carbon atoms.

8. A product as defined in claim 4 in which said linear addition polymer is a copolymer of at least alkyl acrylate in which the alkyl group has 1 to 4 carbon atoms with up to 7% of a copolymerizable monoethylenically unsaturated acid.

9. A product as defined in claim 4 in which said linear addition polymer is a copolymer of at least one alkyl acrylate in which the alkyl group has 1 to 4 carbon atoms with up to 7% of a copolymerizable monoethylenically unsaturated amide of an acid of the aforesaid formula.

10. A product as defined in claim 4 in which said linear addition polymer is a copolymer of 70 to 93% by weight of vinyl acetate, 5 to 25% by weight of an alkyl acrylate in which the alkyl group has 1 to 2 carbon atoms, and 2 to 8% by weight of an acid selected from the group consisting of acrylic acid, methacrylic acid, and itaconic acid.

11. A method of producing mineral-coated paper which comprises coating at least one side of a paper sheet with an aqueous dispersion of 40 to 70% total solids concentration, having a pH of 8.5 to 9.5, and containing a pigment having a predominant proportion of clay and 8 to 25%, on the total weight of pigment, of a binder comprising, for each 100 parts by weight of the pigment, from 8 to 25 parts by weight of a mixture comprising (a) 5 to 65% by weight of a water-soluble ammonium salt of a copolymer, having a molecular weight of at least about 50,000, of about 15 to 40% by weight of an acid of the formula $$CH_2=C-(CH_2)_{n-1}H$$
$$|$$
$$COOH$$

in which $n$ is an integer having a volume of 1 to 2, and 60 to 85% of at least one ester of an acid of the aforesaid formula with an alcohol having 1 to 2 carbon atoms and (b) 35 to 95% by weight of an alkali-soluble protein, drying, and calendering the coated sheet.

12. A method of producing mineral-coated paper which comprises coating at least one side of a paper sheet with an aqueous dispersion of 40 to 70% total solids concentration, having a pH of 8.5 to 9.5, and containing a pigment having a predominant proportion of clay and 8 to 25%, on the total weight of pigment, of a binder comprising, for each 100 parts by weight of the pigment, from 8 to 25 parts by weight of a mixture comprising (a) 5 to 65% by weight of a water-soluble ammonium salt of a copolymer, having a molecular weight of at least about 50,000, of about 15 to 40% by weight of an acid of the formula $$CH_2=C-(CH_2)_{n-1}H$$
$$|$$
$$COOH$$

in which $n$ is an integer having a value of 1 to 2, and 60 to 85% of at least one ester of an acid of the aforesaid formula with an alcohol having 1 to 2 carbon atoms and (b) 35 to 95% by weight of a water-insoluble, alkali-insoluble linear addition polymer having an apparent second order transition temperature of −45° to +20° C., drying, and calendering the coated sheet.

13. A method of producing mineral-coated paper which comprises coating at least one side of a paper sheet with an aqueous dispersion of 40 to 70% total solids concentration, having a pH of 8.5 to 9.5, and containing a pigment having a predominant proportion of clay and 8 to 25%, on the total weight of pigment, of a binder comprising, for each 100 parts by weight of the pigment, from 8 to 25 parts by weight of a mixture comprising (a) 5 to 65% by weight of a water-soluble ammonium salt of a copolymer, having a molecular weight of at least about 50,000, of about 15 to 40% by weight of an acid of the formula

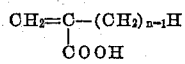

in which $n$ is an integer having a value of 1 to 2, and 60 to 85% of at least one ester of an acid of the aforesaid formula with an alcohol having 1 to 2 carbon atoms and (b) 35 to 95% by weight of a water-insoluble, alkali-insoluble linear addition copolymer of 70 to 93% by weight of vinyl acetate, 5 to 25% by weight of an alkyl acrylate in which the alkyl group has 1 to 2 carbon atoms, and 2 to 8% by weight of an acid selected from the group consisting of acrylic acid, methacrylic acid, and itaconic acid, and drying the coated sheet.

References Cited in the file of this patent

UNITED STATES PATENTS

| | | |
|---|---|---|
| 2,754,280 | Brown et al. | July 10, 1956 |
| 2,759,847 | Frost et al. | Aug. 21, 1956 |
| 2,790,736 | McLaughlin et al. | Apr. 30, 1957 |
| 2,865,773 | McKnight et al. | Dec. 23, 1958 |
| 2,874,066 | McLaughlin et al. | Feb. 19, 1959 |
| 2,923,646 | Jordan | Feb. 2, 1960 |